United States Patent

[11] 3,627,894

[72] Inventors John C. Babcock;
J. Allan Campbell, both of Kalamazoo, Mich.
[21] Appl. No. 666,488
[22] Filed Sept. 8, 1967
[45] Patented Dec. 14, 1971
[73] Assignee The Upjohn Company
Kalamazoo, Mich.
Continuation-in-part of application Ser. No. 114,621, June 5, 1961, now Patent No. 3,341,557, Continuation-in-part of application Ser. No. 69,557, Nov. 6, 1960, now abandoned. This application Sept. 8, 1967, Ser. No. 666,488

[54] PHARMACEUTICAL COMPOSITIONS COMPRISING 72-METHYL ESTRONE AND METHODS FOR USING SAME
4 Claims, No Drawings
[52] U.S. Cl..................................... 424/243,
260/239.55, 260/397.4, 195/51
[51] Int. Cl..................................... C07c 169/20
[50] Field of Search............................ /Hand
Searched Steroids

[56] References Cited
UNITED STATES PATENTS
3,318,925  5/1967  Anner et al................... 260/397.5
FOREIGN PATENTS
1,434,174  2/1966  France........................ 260/397.5

Primary Examiner—Elbert L. Roberts
Attorneys—Willard L. Cheesman and John Kekich ABSTRACT: This invention relates to novel steroid compounds and processes for their preparation; more particularly to those compounds embraced by the formula (II)

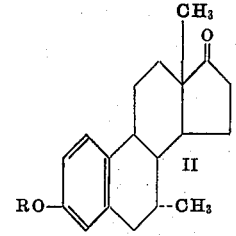

wherein R is selected from the group consisting of hydrogen, the acyl radical of a hydrocarbon carboxylic acid containing from one through twelve carbon atoms, an alkyl radical containing from one through eight carbon atoms, tetrahydrofuranyl, tetrahydropyranyl, 5-substituted tetrahydropyranyl, and a silyl radical of the formula

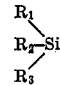

wherein $R_1$, $R_2$ and $R_3$ are selected from the group consisting of alkyl of one through six carbon atoms and phenyl.

PHARMACEUTICAL COMPOSITIONS COMPRISING 7₂-METHYL ESTRONE AND METHODS FOR USING SAME

CROSS-REFERENCES TO RELATED APPLICATIONS

This application is a continuation-in-part of Application Ser. No. 114,621, filed June 5, 1961, now Pat. No. 3,341,557 which is in turn a continuation-in-part of abandoned Application Ser. No. 69,557, filed Nov. 6, 1960.

BRIEF SUMMARY OF THE INVENTION

7α-methylestrone, embraced by formula 11, above, can be prepared by several known methods described below.

1. By fermentation of 7α-methyl-19-nortestosterone (1) or 7α-methyl-19-nor-4-androstene-3,17-dione with a micro-organism or its enzymes capable of introducing a double bond in the 1(2) or 1(2)- and 4(5)-positions of the steroid nucleus, e.g., *Corynebacterium simplex* or *Septomyxa affinis* to yield 7α-methylestrone (11).

2. By catalytically dehydrogenating 7α-methyl-19-nor-4-androstene-3,17-dione at the 1(2)-positions, e.g., by heating in the presence of a hydrogenation catalyst (e.g., palladium on charcoal) in a high boiling solvent (e.g., cymene), to give 7α-methylestrone (11).

3. By treating 7α-methyl-19-nor-4-androstene-3,17-dione with a chemical dehydrogenating agent, e.g., a quinone such as 2,3-dichloro-5,6-dicyanobenzoquinone (DDQ) or 2,3,5,6-tetrachloro-1,4-benzoquinone (chloranil), or selenium compounds such as selenium dioxide or dibenzoyloxy selenium oxide, to yield 7α-methylestrone (11).

4. By pyrolysis of 7α-methyl-1,4-androstadiene-3,17-dione at elevated temperatures (e.g., between about 400° to 600° C.) in high boiling diluents (e.g., heavy mineral oil) to give 7α-methylestrone (11).

5. By treating 7α-methyl-1,4-androstadiene-3,17-dione in accordance with the procedures described in J. Amer. Chem. Soc. 86, 742, i.e., with lithium and diphenyl in the presence of diphenylmethane and employing tetrahydrofuran as solvent, to yield 7α-methylestrone (11).

The 3-ethers of 7α-methylestrone of formula 11, above, can be prepared by the known methods described below.

1. By treating 7α-methylestrone (11) in accordance with the procedures disclosed in British Pat. No. 909,662, i.e., with an alkyl (or cycloalkyl) halide and an alkali metal alkylate, preferably at reflux temperature, to give a 3-alkyl (or cycloalkyl) ether of 7α-methylestrone (11).

2. By treating 7α-methylestrone (11) with an alkylating agent (e.g., a dialkylsulfate) in conventional manner, to give a 3-alkyl ether of 7α-methylestrone (11).

3. By treating 7α-methylestrone (11) with a cyclic enol ether (e.g., dihydrofuran, dihydropyran, 5-hydroxymethyl-dihydropyran, 5-carboxydihydropyran, etc.) at low temperature, preferably in the presence of an acidic catalyst (e.g., phosphorus oxychloride), to give the corresponding 3-ether (e.g., tetrahydrofuranyl, tetrahydropyranyl, 5-hydroxymethyl-tetrahydropyranyl, etc.) of 7α-methylestrone (11).

4. By treating 7α-methylestrone (11) with a diazoalkane (e.g., diazomethane, diazoethane, diazobutane, etc.) at ambient temperature in an inert solvent such as ether, ethylene glycol dimethyl ether, etc., to give the corresponding 3-alkyl ether of 7α-methylestrone (11).

5. By treating 7α-methylestrone (11) with a disilazane of the formula

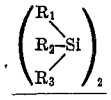

NH wherein R₁, R₂ and R₃ have the same meaning as above (e.g., hexamethyldisilazane, symmetrical diphenyl-tetramethyldisilazane, 1-methyl-1,1-dibutyl-3-phenyl-3,3-dimethyldisilazane, hexa-amyldisilazane, etc.) to yield a corresponding 3-silyl ether of 7α-methylestrone (11).

The 3-acylates of 7α-methylestrone of formula 11, above, can be prepared by conventional procedures, e.g., by treating 7α-methylestrone (11) with the appropriate organic carboxylic acid anhydride (or chloride) at moderate temperatures in the presence of an esterification catalyst such as pyridine, to yield the corresponding 7α-methylestrone 3-acylate (11).

All of the compounds included within formula 11, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, methanol, dilute methanol, ethanol, ether, methylene chloride and Skellysolve B (hexanes), mixtures and combinations of these solvents; also by gradient elution chromatography from an adsorbent column with a suitable mixture of solvents, such as methylene chloride-Skellysolve B, acetone-Skellysolve B, and the like, and by crystallization.

The compounds of formula 11 of the present invention are potent estrogens when administered either orally or parenterally; e.g., when assayed in rats by the Allen-Doisy test 7α-methylestrone (11) was found to have approximately three times the activity of estrone. These compounds have also demonstrated marked antifertility activity in the male and female rat. These compounds when administered to mammals, birds and animals, are also active in lowering cholesterol in the blood, inhibiting gonadatropin secretion, producing anabolic response, especially in providing nitrogen retention, and in supplying calcium lost as a result of osteoporosis. In addition, the compounds of formula 11, when combined with progestins such as 6α-methyl-17α-hydroxyprogesterone 17-acetate (Provera), 7α-methyl-17α-ethylnyl-19-nortestosterone, 17α-hydroxy-6-methyl-16-methylene-4,6-pregnadiene-3,20-dione 17-acetate (Melengestrol acetate), 17-hydroxy-19-nor-17α-pregn-5(10)-en-20-yn-3-one (Norethynodrel), 19-nor-17α-pregn-4-en-20-yne-3β, 17-diol 3,17-diacetate (Ethynodiol diacetate), 17-hydroxy-19-nor-17α-pregn-4-en-20-yn-3-one (Norethindrone), the corresponding 17-acetate (Norethindrone acetate), 6α,21-dimethyl-17β-hydroxy-4-pregnen-20-yn-3-one (Dimethisterone), 6-chloro-17α-hydroxy-4,6-pregnadiene-3,20-dione 17-acetate, etc., are useful for the prevention of ovulation in mammals. The foregoing properties make the new compounds useful in veterinary practice.

The compounds of the invention can be prepared and administered to mammals, birds, and animals, in the wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

DETAILED DESCRIPTION

It is to be understood that the invention is not to be limited to the exact details of operation or exact compositions shown and described herein, as obvious modifications and equivalents will be apparent to one skilled in the art, and the invention is therefore to be limited only by the scope of the appended claims.

EXAMPLE 1

7α-methylestrone(7α-methyl-1,3,5(10)-estratrien-3-ol-17-one) (11)

To 10 l. of a sterile glucose-yeast extract medium there was added an inoculum of 500 ml. of *Corynebacterium simplex* ATCC 6946. The culture was stirred and aerated for about 48 hours at a temperature of about 28° C., lard oil being added to suppress the foam. After about 48 hours the pH was 6.1. To the fermentor, 1 g. of 7α-methyl-19-nortestosterone (1), prepared as in Steroids 1, 317, was added and aeration continued for about 24 hours. At this time the pH was 6.5. The beer was adjusted to pH 3 with hydrochloric acid and extracted four times with 3 l. of methylene chloride. Paper chromatography of an aliquot of the solvent extract indicated, by the Bush B-3 system, that essentially all of the 7α-methyl-19-nortestosterone (1) had been reacted and that two compounds showing the characteristics of aromatic A ring steroids were present. The less polar compound had the mobility of l. 7α-methylestrone (11) and the more polar that of 7α-methylestradiol. The methylene chloride extracts were evaporated to dryness and the residues obtained used for isolating the fermentation products. The crude residue was dissolved in methylene chloride and chromatographed through a 150 g. Florisil (synthetic magnesium silicate) column packed wet with Skellysolve B (hexanes) and eluted with 400 ml. fractions by gradient elution between 5 l. of 4 percent acetone-Skellysolve B and 5 l. of 12 percent acetone-Skellysolve B. Fractions 4 through 7 gave well formed crystals. These fractions were combined and recrystallized from methanol with Darco (activated charcoal) treatment to give 0.45 g. of 7α-methylestrone (11), melting at 237° to 238° C.; $\lambda_{max}^{alc}$. 280 mµ; ε=2,100.

Anal. Calcd. for $C_{19}H_{24}O_2$: C, 80.21; H, 8.51. Found: C, 80.10; H, 8.34.

A small amount of 7α-methylestradiol can be isolated from the more polar fractions.

EXAMPLE 2

7α-methylestrone (11)

A sterile medium was prepared containing 10 l. of tap water, 20 g. of cornsteep liquors and 100 g. of commercial dextrose and adjusted to pH 5 with sodium hydroxide. This was inoculated with 500 ml. of a vegetative growth of *Septomyxa affinis* (ATCC 6737) grown on the same medium. The culture was stirred and aerated at a rate of 0.1 l./minute. At the end of about 24 hours the pH was 7. To the fermentor, 2 g. of 7α-methyl-19-nortestosterone (1) and 0.1 g. of 3-ketobisnor-4-cholen-22-al. dissolved in 20 ml. of N,N-dimethylformamide was added. Aeration was continued for about 48 hours, the pH adjusted to 3 and the beer extracted four times with methylene chloride. Paper chromatography indicated the presence of 7α-methylestrone (11) in the extract. The product (11) can be isolated in accordance with the procedure described in example 1 to give essentially pure 7α-methylestrone (11).

Following the procedure of examples 1 and 2 but substituting 7α-methyl-19-nor-4-androstene-3,17-dione for 7α-methyl-19-nortestosterone (1) also yields 7α-methylestrone (11).

EXAMPLE 3

7α-methylestrone (11)

A mixture of 100 mg. of 7α-methyl-19-nor-4-androstene-3,17-dione, 40 mg. of 5 percent palladium on charcoal catalyst in 100 ml. of p-cymene (purified by passing through a column of alumina) was refluxed for about 1.5 hours. The catalyst was removed by filtration and the filtrate concentrated in a rotary evaporator. The residue was crystallized from ether to give 25 mg. of 7α-methylestrone (11), melting at 218° to 230° C., $\lambda_{max}^{alc}$. 279 mµ; ε=2,150. Infrared spectral analysis indicates it is the same compound as prepared in examples 1 and 2. The product can be further purified by recrystallization or chromatography to give essentially pure 7α-methylestrone (11).

EXAMPLE 4

7α-methylestrone (11)

To a solution of 100 mg. of 7α-methyl-19-nor-4-androstene-3,17-dione, 100 mg. of 2,3-dichloro-5,6-dicyanobenzoquinone (DDQ) and 0.5 ml. of acetic acid in 3 ml. of dioxane, 2 drops of 2.8 N hydrochloric acid solution in dioxane was added. After standing for about 16 hours, methylene chloride was added to the mixture and the DDQ filtered off. The filtrate was dried and the solvent removed. The residue, weighing about 30 mg. was triturated with methanol to give about 1 mg. of 7α-methylestrone (11) with $\lambda_{max}^{alc}$. 280 mµ; ε=2,350. Infrared analysis indicated that the thus produced compound is the same as those prepared in examples 1, 2 and 3.

Following the procedure of example 4, but substituting selenium dioxide or tetrachloro-p-benzoquinone (chloranil) for DDQ, also yields 7α-methylestrone (11).

EXAMPLE 5

7α-methylestrone (11)

A pyrolysis tube (18 inches ×1 inches) equipped with thermocouples about 3 inches from each end and packed with glass tubing cut in about ¼ inch lengths was heated to about 550° C. and heavy mineral oil passed through at a rate of 5 ml./minute until constant temperature of 500° to 510° C. at the top and 540° to 560° C. at the bottom was obtained. A mixture of 10.4 g. of 7α-methyl-1,4-androstadiene-3,17-dione and 500 ml. of heavy mineral oil mixed in a Waring blender was added at a rate of 5 ml./minute, maintaining the above temperatures. The effluent was refrigerated for several hours and the crystalline precipitate collected, washed thoroughly with Skellysolve B and dried to give 6.7 g. of crude 7α-methylestrone (11). It was dissolved in hot methylene chloride, cooled and poured on a 350 g. Florisil column packed wet with Skellysolve B and eluted with 400 ml. fractions by gradient elution between 5 l. of 4 percent acetone-Skellysolve B and 5 l. of 12 percent acetone-Skellysolve B. The desired product was contained in fractions 10 through 21. The residues obtained from these fractions were combined and recrystallized from methanol to give 3.75 g. of 7α-methylestrone (11), having a melting point of 230° to 235° C.; $[α]_D$ + 140° (chloroform); $\lambda_{max}^{alc}$. 279 mµ; ε=2,250. Nuclear magnetic resonance (NMR) spectra confirm the proposed structure and infrared spectral analysis shows it is the same as the product obtained in examples 1, 2, 3 and 4.

EXAMPLE 6

7α-methylestrone (11)

Treating 7α-methyl-1,4-androstadiene-3,17-dione in accordance with the procedures described in J. Amer. Chem. Soc. 86, 742, namely, with lithium and diphenyl in the presence of diphenylmethane and employing tetrahydrofuran as solvent, yields 7α-methylestrone (11).

EXAMPLE 7

7α-methylestrone 3-cyclopentyl ether (11)

A mixture of 1 g. of 7α-methylestrone (1) and 1 g. of cyclopentyl bromide is added slowly to a solution of sodium ethylate (prepared from 0.1 g. of sodium and 8 ml. of absolute ethanol). The reaction mixture is heated to reflux for about 4 hours, the ethanol removed by distillation and the residue treated with a small amount of water. A precipitate of 7α-methylestrone 3-cyclopentyl ether (11) is obtained which is recrystallized from a mixture of methylene chloride and methanol.

EXAMPLE 8

7α-methylestrone 3-methyl ether (11)

To 4 g. of 7α-methylestrone (11) in a solution containing 6.4 g. of potassium hydroxide, 14 ml. of water and 21 ml. of methanol, 14 ml. of dimethylsulfate was added dropwise with stirring and cooling sufficient to keep the reaction temperature at 25° to 35° C. At the same time a solution of 14 g. of potassium hydroxide in 28 ml. of water and 42 ml. of methanol was added dropwise at a rate that kept the pH of the reaction mixture above 10. The addition of the dimethylsulfate required about 30 minutes and the addition of the potassium hydroxide solution about 1 hour. The reaction mixture was stirred an additional 1.5 hours. Water was added and the crystalline product collected on a filter, washed with water and dried to yield 3.8 g. of product (11) melting at 155° to 163° C. It was recrystallized from methanol to give an analytical sample of 7α-methylestrone 3-methyl ether (11) melting point 163° to 165° C.; $\lambda_{max}^{alc}$. 276 mμ; ϵ=2,100; $\lambda_{max}^{alc}$. 286 mμ; ϵ=2,050.

Anal. Calcd. for $C_{20}H_{28}O_2$: C, 79.95; H, 9.39. Found: C, 80.28; H, 9.48.

Following the procedure of example 8 but substituting for dimethysulfate the following:
1. diethylsulfate,
2. dipropylsulfate,
3. diisopropylsulfate,
4. dibutylsulfate,
5. di-s-butylsulfate,
6. dipentylsulfate,
7. dihexylsulfate,
8. diheptylsulfate and
9. dioctylsulfate, yields, respectively,
1. 7α-methylestrone 3-ethyl ether (11),
2. 7α-methylestrone 3-propyl ether (11),
3. 7α-methylestrone 3-isopropyl ether (11),
4. 7α-methylestrone 3-butyl ether (11),
5. 7α-methylestrone 3-s-butyl ether (11),
6. 7α-methylestrone 3-pentyl ether (11),
7. 7α-methylestrone 3-hexyl ether (11),
8. 7α-methylestrone 3-heptyl ether (11) and
9. 7α-methylestrone 3-octyl ether (11).

EXAMPLE 9

7α-methylestrone 3-tetrahydropyranyl ether (11)

To a solution of 4. g. of 7α-methylestrone (11) in 40 ml. of tetrahydrofuran (purified by percolation through a column of alumina) and 8 ml. of freshly distilled dihydropyran, 0.4 ml. of phosphorus oxychloride was added dropwise with stirring under nitrogen and cooling in an ice bath. After the addition was completed the ice bath was removed and after an additional 15 minutes the reaction mixture was poured into a mixture of saturated solution of sodium bicarbonate, ether and ice. The ether layer was separated, washed with dilute sodium bicarbonate solution, water, dried over sodium sulfate and filtered. The filtrate was evaporated to dryness to give 5.1 g. of 7α-methylestrone 3-tetrahydropyranyl ether (11).

Following the procedure of example 9 but substituting for dihydropyran the following:
1. dihydrofuran,
2. 5-hydroxymethyldihydropyran,
3. 5-carboxydihydropyran, etc., yields, respectively,
1. 7α-methylestrone 3-tetrahydrofuranyl ether (11),
2. 7α-methylestrone 3-(5-hydroxymethyl)pyranyl ether (11),
3. 7α-methylestrone 3-(5-carboxyl)pyranyl ether (11), etc.

EXAMPLE 10

7α-methylestrone 3-acetate (11)

To 1 g. of 7α-methylestrone (11), 2 ml. of pyridine and 1 ml. of acetic anhydride is added. The reaction mixture is kept at room temperature for about 3 hours; water is then added to precipitate the product (11) and destroy the excess acetic anhydride. Recrystallization from acetone and Skellysolve B yields 7α-methylestrone 3-acetate (11).

Following the procedure of example 10 but substituting for acetic anhydride the following:
1. benzoic acid anhydride,
2. propionic anhydride,
3. i-butyryl chloride,
4. valeryl chloride,
5. decanoyl chloride,
6. hexanoic anhydride,
7. sec. octanoic anhydride,
8. capric anhydride,
9. undecyl anhydride,
10. dodecanoyl chloride, etc., yields, respectively,
1. 7α-methylestrone 3-benzoate (11),
2. 7α-methylestrone 3-propionate (11),
3. 7α-methylestrone 3-i-butyrate (11),
4. 7α-methylestrone 3-valerate (11),
5. 7α-methylestrone 3-decanoate (11),
6. 7α-methylestrone 3-hexanoate (11),
7. 7α-methylestrone 3-sec. octanoate (11),
8. 7α-methylestrone 3-caproate (11),
9. 7α-methylestrone 3-undecanoate (11),
10. 7α-methylestrone 3-dodecanoate (11), etc.

EXAMPLE 11

7α-methylestrone 3-trimethylsilyl ether (11)

To a suspension of 4 g. of 7α-methylestrone (1) in 10 ml. of dry acetone, 6.5 ml. of hexamethyldisilazane was added. The mixture was stirred for about 4 days and then evaporated to dryness. The residue was dissolved in a mixture of methylene chloride and Skellysolve B and chromatographed over a 250 g. column of Florisil. Gradient elution between 5 l. of Skellysolve B and 5 l. of 10 percent acetone-90 percent Skellysolve B yielded 2.5 g. of 7α-methylestrone-3-trimethylsilyl ether (11) having a melting point of 103° to 107° C.

Following the procedure of example 11 but substituting other disilazanes for hexamethyldisilazane, such as symmetrical diphenyltetramethyldisilazane, hexaamyldisilazane, etc., yields respectively, 7α-methylestrone 3-phenyldimethylsilyl ether (11), 7α-methylestrone 3-triamylsilyl ether (11), etc.

The reactions of example 11 and the paragraph thereafter are preferably carried out with the addition of a few drops of 2 ml. of trimethylsilyl chloride.

In place of acetone in example 11, other inert dry solvents, such as tetrahydrofuran, dioxane, methylene chloride and the like, can be utilized.

The 7α-methylestrone 3-silyl ethers (11) exhibit strong estrogenic, antifertility and gonadatropin suppressing activities. They can be administered orally or, preferably, by injection.

As indicated above, the compounds of this invention are useful for their estrogenic activity. Administration to mammals depends on the particular compound involved, route of administration, severity of the condition being treated and the individual's response thereto. In general, a dose of between about 0.01 mg. to about 5 mg. of each of the compounds exemplified in examples 1 through 11 and embraced within formula 11 is given orally once a day, or subcutaneously or intramuscularly in a dose of 0.05 to 10 mg. weekly to monthly, in the treatment of conditions incident to the foregoing activity when incorporated in conventional pharmaceutical compositions.

The following examples illustrate the incorporation of the active ingredients of this invention in pharmaceutical formulation for use as estrogenics or antifertility agents.

EXAMPLE 12

Compressed tablets

A lot of 10,000 compressed tablets, each containing 0.05 mg. of 7α-methylestrone or 7α-methylestrone 3-methyl ether is prepared from the following ingredients:

| | |
|---|---|
| 7α-methylestrone or 7α-methylestrone 3-methyl ether | 0.5 g. |
| Dicalcium phosphate | 2,500 g. |
| Methylcellulose, USP (15 cps.) | 65 g. |
| Talc, bolted | 450 g. |
| Calcium stearate, fine powder | 35 g. |

The 7α-methylestrone or 7α-methylestrone 3-methyl ether and dicalcium phosphate are mixed well, granulated with 7.5 percent solution of methylcellulose in water, passed through a No. 8 screen and dried at 120° F. The dried granules are passed through a No. 12 screen, mixed thoroughly with the talc and stearate and compressed into tablets.

EXAMPLE 13

Hard gelatin capsules

A lot of 1,000 hard gelatin capsules, each containing 0.5 mg. of 7α-methylestrone or 7α-methylestrone 3-methyl ether is prepared from the following ingredients:

| | |
|---|---|
| 7α-methylestrone or 7α-methylestrone 3-methyl ether | 0.5 g. |
| Lactose | 150 g. |
| Calcium stearate | 2 g. |
| Talc | 3 g. |

The lactose, talc and stearate are mixed well and incorporated into the mixture. The whole is mixed well and filled into two-piece hard gelatin capsules.

EXAMPLE 14

Soft gelatin capsules

A batch of 1,000 soft gelatin capsules, each containing 0.5 mg. of 7α-metylestrone or 7α-methylestrone 3-methyl ether and corn oil is prepared from the following materials:

| | |
|---|---|
| 7α-methylestrone or 7α-methylestrone 3-methyl ether | 0.5 g. |
| Corn oil | q.s. |

A uniform dispersion of the active ingredient in the corn oil is prepared and the dispersion filled into soft gelatin capsules by conventional means.

EXAMPLE 15

Aqueous oral suspension

An aqueous oral suspension containing in each 5 ml. 0.5 mg. of 7α-methylestrone or 7α-methylestrone 3-methyl ether is prepared from the following materials:

| | |
|---|---|
| 7α-methylestrone or 7α-methylestrone 3-methyl ether, micronized | 1.0 g. |
| Methylparaben, USP | 7.5 g. |
| Propylparaben, USP | 2.5 g. |
| Saccharin sodium | 12.5 g. |
| Cyclamate sodium | 2.5 g. |
| Glycerin | 3,000 ml. |
| Tragacanth powder | 100 g. |
| Orange oil flavor | 10 g. |
| F. D. and C. orange dye | 7.5 g. |
| Deionized water, q.s. to | 10,000 ml. |

EXAMPLE 16

Aqueous suspension for injection

A suspending vehicle is prepared from the following materials:

| | |
|---|---|
| Polyethylene glycol 4000 | 30 g. |
| Potassium chloride | 11.2 g. |
| Polysorbate 80 | 2 g. |
| Methylparaben | 1.8 g. |
| Propylparaben | 0.2 g. |
| Water for injection q.s. | 1000 ml. |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 0.5 g. of 7α-methylestrone or 7α-methylestrone 3-methyl ether which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 0.5 mg. 7α-methylestrone or 7α-methylestrone 3-methyl ether.

As indicated above, the compounds of this invention, in addition to their use as estrogenics and antifertility agents, when combined with progestins, e.g., 6α-methyl-17α-hydroxyprogesterone 17-acetate (Provera), 7α-methyl-17α-ethynyl-19-nortestosterone, 17α-hydroxy-6-methyl-16-methylene-4,6-pregnadiene-3,20-dione 17-acetate (Melengestrol acetate), etc., are useful for the prevention of ovulation in mammals. Administration to mammals depends on the particular progestin and estrogen involved and the individual's response thereto. In general, a dose of between about 0.01 mg. to about 5 mg. of each of the estrogens exemplified in example 1 through 11 and embraced within formula 11 plus between about 1 mg. to about 100 mg. of a progestin is given at such time(s) in the mammalian ovulatory cycle as is suitable for the prevention of ovulation.

The following examples illustrate the incorporation of the active ingredients of this invention with progestins in pharmaceutical formulation for use as anovulatory agents.

EXAMPLE 17

Oral tablets 50,000 tablets for oral administration are prepared from the following types and amounts of materials. Each tablet contains 3.0 mg. of 6α-methyl-17α-hydroxyprogesterone 17-acetate and 0.03 mg. of 7α-methylestrone or 7α-methylestrone 3-methyl ether.

| | |
|---|---|
| 6α-methyl-17α-hydroxyprogesterone 17-acetate | 5 oz. |
| 7α-methylestrone or 7α-methylestrone 3-methyl ether | 23 grains |
| Lactose | 3 lbs. |

The finely powdered active ingredients and lactose are mixed well and granulated with syrup-starch paste. Starch and calcium stearate are used as lubricants in the compressing step.

EXAMPLE 18

Oral tablets 10,000 tablets for oral administration are prepared from the following types and amounts of ingredients. Each tablet contains 10 mg. of 6α-methyl-17α-hydroxyprogesterone 17-acetate and 0.05 mg. of 7α-methylestrone or 7α-methylestrone 3-methyl ether.

| | |
|---|---|
| 6α-methyl-17α-hydroxyprogesterone 17-acetate | 100 g. |
| 7α-methylestrone or 7α-methylestrone 3-methyl ether | 0.5 g. |
| Lactose | 2,600 g. |

The finely powdered active ingredients and lactose are mixed well and granulated with syrup-starch paste. Starch talc and calcium stearate are used as lubricants in the compressing step.

EXAMPLE 19

Oral aqueous suspension

An aqueous suspension for oral administration, containing in each teaspoonful (approximately 5 ml. 5 mg. of 6α-methyl-17α-hydroxyprogesterone 17-acetate and 0.2 mg. of 7α-methylestrone or 7α-methylestrone 3-methyl ether is prepared from the following types and amounts of ingredients:

| | |
|---|---|
| 6α-methyl-17α-hydroxyprogesterone 17-acetate | 1 g. |
| 7α-methylestrone or 7α-methylestrone 3-methyl ether | 40 mg. |
| Preservative | 2 g. |
| Flavor, q.s. | |
| Purified water USP, a.s. and 1000 ml. | |

The preservative and flavor are dissolved in the water. The micronized active ingredients are added and the whole is homogenized.

EXAMPLE 20

Oral gelatin capsules

One thousand gelatin capsules for oral administration, each containing 10 mg. of 6α-methyl-17α-hydroxyprogesterone 17-acetate and 0.05 mg. of 7α-methylestrone or 7α-methylestrone 3-methyl ether are prepared from the following types and amounts of materials:

| | |
|---|---|
| 6α-methyl-17α-hydroxyprogesterone 17-acetate | 10 g. |
| 7α-methylestrone or 7α-methylestrone 3-methyl ether | 50 mg. |
| Ingestible oil, q.s. | |

The micronized active ingredients and the oil are mixed and the mix is encapsulated by the usual techniques into gelatin capsules.

EXAMPLE 21

Oral tablets

Following the procedure of example 17, 5,000 tablets are prepared from the following types and amounts of ingredients. Each tablet:

| | |
|---|---|
| 5 mg. 6α-methyl-17α-hydroxyprogesterone 17-acetate | 25 g. |
| 0.01 mg. 7α-methylestrone or 7α-methylestrone 3-methyl ether | 50 mg. |
| 150 mg. lactose | 750 g. |
| 3 mg. acacia | 15 g. |
| 65 mg. starch, bolted | 325 g. |
| 3 mg. calcium stearate | 15 g. |

Tablets equally suited for the inhibition of ovulation are prepared by using 250 and 1000 mg., respectively, of the 7α-methylestrone or 7α-methylestrone 3-methyl ether in place of the 50 mg. in the above formulation.

While the procedures described above in examples 17 through 21 recite the use of the progestin 6α-methyl-17α-hydroxyprogesterone 17-acetate, other progestational compounds can be substituted therefor to provide similarly effective anovulatory pharmaceutical formulations; e.g., 7α-methyl-17α-ethynyl-19-nortestosterone, 17α-hydroxy-6-methyl-16-methylene-4,6-pregnadiene-3,20-dione 17-acetate, 17-hydroxy-19-nor-17α-pregn-5(10)-en-20-yn-3-one, 19-nor-17α-pregn-4-en-20-yne-3β, 17-diol 3,17-diacetate, 17-hydroxy-19-nor-17α-pregn-4-en-20-yn-3-one 17-acetate, 6α,21-dimethyl-17β-hydroxy-4-pregnen-20-yn-3-one, 6-chloro-17α-hydroxy-4,6-pregnadiene-3,20-dione 17-acetate, etc., can be employed instead of 6α-methyl-17α-hydroxyprogesterone 17-acetate.

In place of 7α-methylestrone (11) and 7α-methylestrone 3-methyl ether (11), other ethers and the acylates of formula 11, such as 7α-methylestrone 3-cyclopentyl ether (11), 7α-methylestrone 3-tetrahydropyranyl ether (11), 7α-methylestrone 3-trimethylsilyl ether (11), 7α-methylestrone 3-acetate (11), etc., can be employed.

We claim:

1. An oral pharmaceutical composition comprising:
   a. about 0.01 to about 5 mg. of a compound of the formula

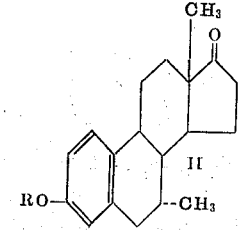

wherein R is selected from the group consisting of hydrogen and methyl, and
   b. about 1 to about 100 mg. of a progestin, dispersed in a pharmaceutical carrier.

2. A composition in accordance with claim 1 wherein the progestin is 7α-methyl-17α-ethynyl-19-nortestosterone.

3. A method of preventing ovulation in ovulating mammals comprising:
   orally administering to ovulating mammals an effective amount of
   a. a compound of the formula

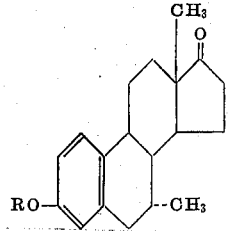

wherein R is selected from the group consisting of hydrogen and methyl, and
   b. a progestin.

4. A method of preventing ovulation in ovulating mammals in accordance with claim 3 wherein the progestin is 7α-methyl-17α-ethynl-19

* * * * *